June 26, 1956 — G. F. HODSMAN — 2,752,146
RELIEVING MECHANISM FOR USE WITH ANALYTICAL BALANCES
Filed May 13, 1952 — 2 Sheets-Sheet 2

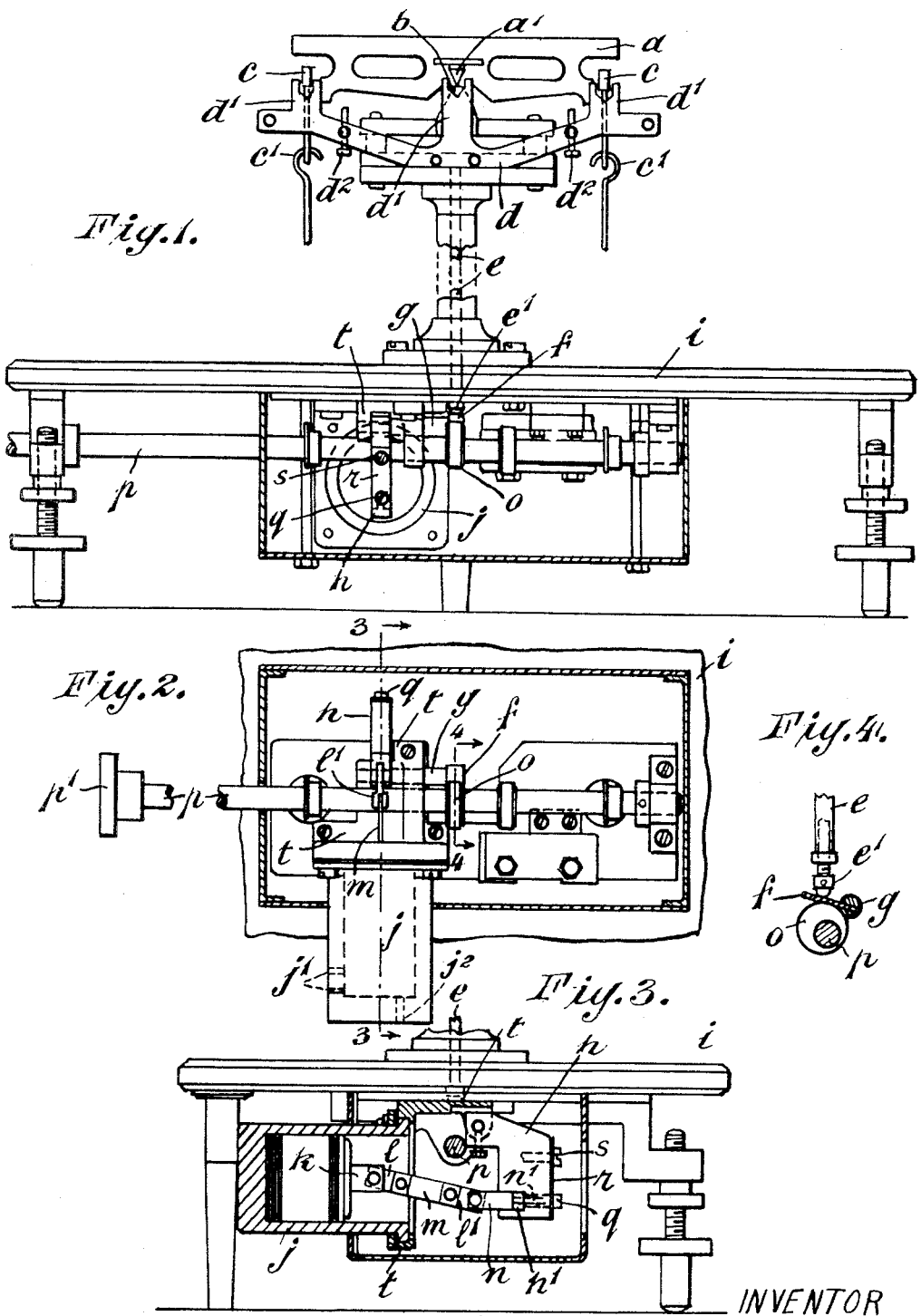

INVENTOR
George Francis Hodsman
BY
Marshall, Marshall & Yeasting
ATTORNEYS

United States Patent Office 2,752,146
Patented June 26, 1956

2,752,146

RELIEVING MECHANISM FOR USE WITH ANALYTICAL BALANCES

George Francis Hodsman, Portman Square, London, England, assignor to L. Oertling Limited, London, England, a British company Application May 13, 1952, Serial No. 287,584

8 Claims. (Cl. 265—54)

This invention has reference to improvements connected with relieving mechanism for use with analytical or chemical balances which are delicate and sensitive in operation and should not be subject to shock in usage.

The object of the present invention is to ensure that, when the weighbeam is lowered from its relieved position in order to effect a weighment i. e. when the knife edges of the weighbeam are brought into contact with their normal bearings or supports and the scale pans are again suspended from the load knife edges, no shock will result from this operation. It is known that practically the whole of the wear on the knife edges of a weightbeam of this character and of the bearings on which the knife edges are normally supported arises from impact between the knife edges and the planes or surfaces of the bearings, therefore if the impact velocity can be minimised the life of a balance of this character can be considerably enhanced even though the weighing operations may be performed by a careless operator.

The invention consists of the use in combination with an analytical or chemical balance of a relieving mechanism for the weightbeam which incorporates automatic means for limiting the velocity of impact between the knife edges and their planes or bearing surfaces when the weighbeam is returned to its operative position, said means incorporating a shock absorber which might for example, be in the form of a dashpot which serves to restrain the speed of motion of the relieving mechanism; the dashpot preferably taking the form of a carbon dashpot the piston whereof is pivotally coupled to a lever which is rocked by means of a cam, said lever indirectly forming a support for the vertical rod of a bearing frame forming part of the relieving mechanism which is cooperative with the weighbeam for the purpose herein set forth; means being provided to admit of an adjustment of the setting of the piston of the dashpot relative to the said lever.

The invention is particularly adapted for association or use in combination with an analytical or chemical balance of the kind hereinbefore referred to, and one form of the invention will now be described as applied to one type of such balance by reference to the accompanying sheet of drawings, in which:

Fig. 1 is a front elevation partly in section of an analytical or chemical balance incorporating the features of the present invention.

Fig. 2 is an under plan partly in section of the lower part of Fig. 1.

Fig. 3 is a part sectional elevation on line 3—3 of Fig. 2.

Fig. 4 is a detailed section on line 4—4 of Fig. 2.

Figure 5:
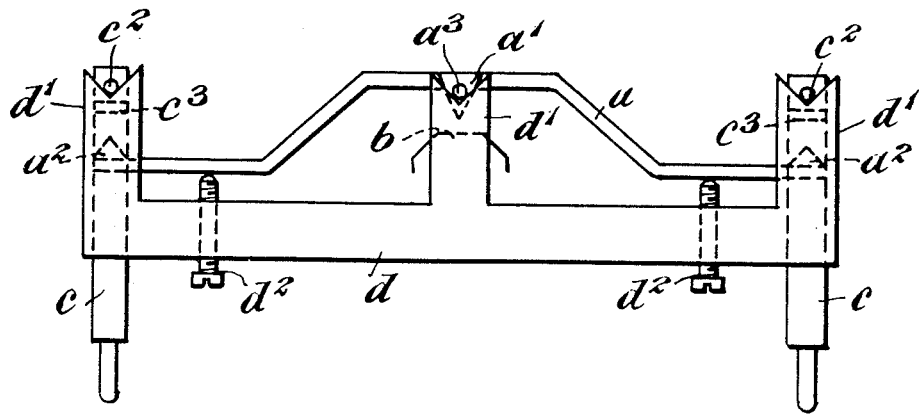
Fig. 5 is a diagrammatic front elevation to an enlarged scale illustrating in outline the weighbeam of the balance associated with the relieving or arrestment frame, the parts being shown in the wholly relieved position.

The invention is shown as applied (see particularly Fig. 1) to the relieving mechanism of an even-armed weighbeam $a$ of an analytical scale, the weighbeam having a fulcrum knife edge $a^1$ which when the balance is in operation rests on a fixed bearing plane or surface $b$, the end or load knife edges $a^2$ of the weighbeam have suspended therefrom stirrups $c$ from which are suspended the hooks $c^1$ which form the means of connection between the stirrups and the scale pans (not shown). The relieving frame $d$ in accordance with normal practice is provided with three lifting forks $d^1$, the two end forks co-operating with trunnions $c^2$ on the stirrups $c$ (see Figs. 5 and 6) while the central fork co-operates with trunnions $a^3$ aligned with the fulcrum knife edge $a^1$.

When the relieving frame $d$ is in its lowermost position the distance of the notches in the central fork below the trunnions $a^3$ is somewhat greater than the average distance of the notches in the end fork below the trunnions $c^2$. Hence when the frame $d$ is elevated the trunnions $c^2$ will be engaged by the end fork before trunnions $a^3$ are engaged by the central fork, whereby in accordance with established practice when the frame $d$ is raised the stirrups $c$ are initially lifted off the end or load knife edges $a^2$ of the weighbeam and subsequently the fulcrum knife edge $a^1$ is lifted off its bearing $b$ whereby a complete relieving of the weighbeam obtains. A reversal of this motion in a manner to be hereinafter described re-establishes the contact of the fulcrum knife edge $a^1$ with its fixed bearing $b$ and the load knife edges $a^2$ with the bearing planes $c^3$ of the stirrups $c$. This relieving motion of the arrestment frame $d$ is effected by means of a vertical rod $e$ connected to this frame, the lower end of the rod being provided with an adjustable bearing foot $e^1$ which rests upon the upper surface of a rockable plate $f$ which is anchored to a rockable spindle $g$. This spindle is fixed in and extends from a cranked lever $h$ which in turn is coupled to the piston rod $k$ of the piston of a carbon dashpot $j$ which is disposed with its longitudinal axis located in a horizontal plane below the base plate $i$ of the balance. The spindle $g$ is freely mounted in a bracket $t$ secured to the underside of the base plate $i$, the bracket $t$ also provides a mounting for the dashpot $j$. The extending end of the piston rod $k$ is pivotally connected to the one terminal piece $l$ of a flexible strip $m$ the other terminal piece $l^1$ of which is pivotally connected to a slidable rectangular block $n$ which is capable of a sliding motion in a slot $h^1$ in the cranked lever $h$.

A rocking motion of the cranked lever $h$ is effected by means of a cam $o$ which is fixed to a spindle $p$ on which is mounted an operating knob $p^1$. The periphery of the cam $o$ bears on the underside of the plate $f$ and serves on rotation to lift or lower, as the case may be, the vertical rod $e$ and to rock the spindle $g$ anchored to the lever $h$, thus effecting a lifting or lowering motion of the weighbeam, and a simultaneous motion of the piston of the dashpot $j$. The slidable block $n$ is provided at its one end with a screwed rod $n^1$ which in turn is located within a tapped hole formed in a slidable bush $q$ mounted in one arm of the cranked lever $h$. This bush is provided with a screw head located externally of the cranked lever whereby upon rotational motion being imparted to the screw head the bush is rotated to effect an adjustment through the screwed rod $n^1$ of the slidable block $n$ within the recess $h^1$ in the lever $h$ and thereby communicates a variation of the initial setting of the piston within its cylinder $j$ through the flexible link $m$. The aforesaid bush is maintained in position relative to its mounting within the cranked lever by means of a leaf spring $r$ one end of which is adapted to engage around the neck obtaining between the screw head and the bush, the other end of the leaf spring $r$ being anchored to one face of the cranked lever $h$ by means of a set screw $s$.

If, when the weighbeam is arrested the knife edges and their bearings are not in contact, subsequently the cam $o$ is rotated to release the weighbeam, this mechanism operates as follows: The weight of the beam and frame exerts at $e^1$ a force on the plate $f$ which causes the spindle $g$ to rotate. The lever $h$ tends to pull the piston along the dashpot but the speed is determined by the rate at which air is admitted behind the piston through the air passage $j^2$ in the end of the dashpot. The speed of travel of the piston and hence of the frame $d$ and therefore the impact velocity of the knife edges and bearings is thus independent of the speed and method of operation of the cam $o$ and the operating knob $p^1$. The rate at which air is admitted through the inlet passage $j^2$ and hence the impact velocity, can be controlled by an adjustable valve at the mouth of this passage. A longitudinal hole in the piston, fitted with a flap valve at its outer end, admits of a quick return stroke of the piston when the cam $o$ is operated so as to arrest the balance.

The aforesaid adjustment of the linkage between the cranked lever $h$ and the piston rod $k$ effects an initial adjustment of the setting of the piston within the cylinder $j$ relative to an air vent in cylinder wall which admits of an added speed of descent of the relieving or arrestment frame $d$ so as to permit of a more rapid descent of the frame $d$ which is desirable to avoid any fouling of the bearing surfaces of this frame with the trunnions $a^3$ and $c^2$ when the weighbeam is freed to effect a weighing operation. When the knife edges of the weighbeam have made contact with their normal bearings the continued lowering motion at an accelerated speed of the relieving or arrestment frame $d$ removes this frame from possible contact with the weighbeam even if the weighbeam rocks on the fulcrum knife edge $a^1$. This added speed of descent of the frame $d$ is permitted through the air passage $j^1$ in the wall of the cylinder $j$.

Figure 6:
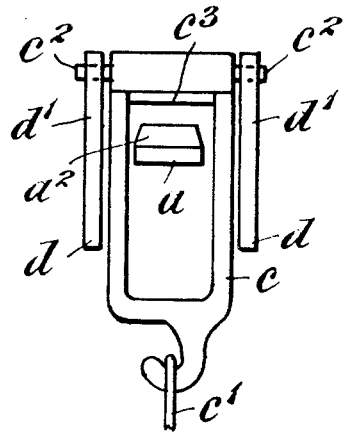
Fig. 6 is an end elevation illustrating one of the end or load knife edges of the weighbeam with its associated stirrup and the co-operative end forks of the relieving or arrestment frame.

Referring now more particularly to the diagrammatic Figs. 5 and 6 of the drawings which illustrate to an enlarged scale the operation of the relieving or arrestment frame $d$ relative to the weighbeam $a$ and the end stirrups $c$, when the knob $p^1$ (see Fig. 2) is rotated to effect a relieving motion of the frame $d$ which as hereinbefore stated results through rotation of the cam $o$ disposed below the base of the rod $e$, the end forks $d^1$ come into contact with the trunnions $c^2$ and thus raise the stirrups $c$ off end knife edges $a^2$ as clearly seen in Fig. 5. A further rotational motion of the knob $p^1$ results in the middle fork of the frame $d$ coming into contact with the trunnions $a^3$ and thereby lifting the fulcrum knife edges $a^1$ off their fixed bearing $b$, the weighbeam and its suspended mechanism are now wholly relieved or arrested and supported by the frame $d$. Simultaneously with the completion of this relieving motion the pair of adjustable set pins $d^2$ are brought into contact with the underside of of the weighbeam $a$ and thus provide a three or four point support for the weighbeam $a$ when in its wholly relieved position to prevent any accidental rocking motion of the weighbeam.

The end elevation (Fig. 6) clearly illustrates the association with a stirrup $c$ of the laterally extending trunnions $c^2$ and the location of the bearing plane $c^3$ within the stirrup, the disposition of the ends of the weighbeam and of the forked ends of the frame $d$ are indicated in this figure relative to the stirrup.

By the use of the aforesaid controlled relieving mechanism freedom from accidental damage of the knife edges and of the bearings of the balance is ensured at every weighing, the speed at which the relieving frame $d$ and the weighbeam $a$ when supported thereon are permitted to descend to the weighing position can be determined at will by the operation of the inlet valve of the inlet passage to the one end of the cylinder. Moreover by the use of a carbon dashpot and piston as herein stated the operation or control is independent of temperature changes and no corrosion obtains between the sliding surface as the piston and cylinder are self-lubricating.

I claim:

1. In a balance, a weighbeam, a sharp fulcrum knife edge fixed to said weighbeam, sharp load knife edges fixed to said weighbeam, a fixed bearing surface engageable by said fulcrum knife edge, load bearing planes engageable with said load knife edges, supporting means for releasably holding said load bearing planes above and out of engagement with said load knife edges and for releasably holding said fulcrum knife edge above and out of engagement with said fixed bearing surface, manually operable means for lowering said supporting means to cause said fulcrum knife edge to engage said fixed bearing surface and said load bearing planes to engage said load knife edges and motion retarding means acting independently of the speed of movement of said manually operable means for controlling the velocity of impact of said fulcrum knife edge upon said fixed bearing surface and the velocity of impact of said load bearing planes upon said load knife edges.

2. In a balance, a weigh beam, a sharp fulcrum knife edge fixed to said weigh beam, sharp load knife edges fixed to said weigh beam, a fixed bearing surface engageable by said fulcrum knife edge, load bearing planes engageable with said load knife edges, supporting means for releasably holding said load bearing planes above and out of engagement with said load knife edges and for releasably holding said fulcrum knife edge above and out of engagement with said fixed bearing surface, a manually operable cam for lowering said supporting means to cause said fulcrum knife edge to engage said fixed bearing surface and said load bearing planes to engage said load knife edges and motion retarding means acting independently of the speed of movement of said manually operable cam for controlling the velocity of impact of said fulcrum knife edge upon said fixed bearing surface and the velocity of impact of said load bearing planes upon said load knife edges, said motion retarding means including an element which limits the speed at which said supporting means can fall in following said cam.

3. In a balance, a weigh beam, a sharp fulcrum knife edge fixed to said weigh beam, sharp load knife edges fixed to said weigh beam, a fixed bearing surface engageable by said fulcrum knife edge, load bearing planes engageable with said load knife edges, supporting means for releasably holding said load bearing planes above and out of engagement with said load knife edges and for releasably holding said fulcrum knife edge above and out of engagement with said fixed bearing surface, manually operable means for lowering said supporting means to cause said fulcrum knife edge to engage said fixed bearing surface and said loading planes to engage said load knife edges, and dashpot mechanism acting independently of the speed of movement of said manually operable means for controlling the velocity of impact of said fulcrum knife edge upon said fixed bearing surface and the velocity of impact of said load bearing planes upon said load knife edges.

4. In a balance, a weigh beam, a sharp fulcrum knife edge fixed to said weigh beam, sharp load knife edges fixed to said weigh beam, a fixed bearing surface engageable by said fulcrum knife edge, load bearing planes engageable with said load knife edges, supporting means for releasably holding said load bearing planes above and out of engagement with said load knife edges and for releasably holding said fulcrum knife edge above and out of engagement with said fixed bearing surface, manually operable means for lowering said supporting means to cause said fulcrum knife edge to engage said fixed bearing surface and said load bearing planes to engage said load knife edges and dashpot mechanism acting independently of the speed of movement of said manually operable means for controlling the velocity of impact of said fulcrum knife edge upon said fixed bearing surface and the velocity of impact of said load bearing planes upon said load knife edges, said dashpot mechanism including an element interposed in the path of a portion of said supporting means and a piston operatively connected to said element.

5. In a balance, a weigh beam, a sharp fulcrum knife edge fixed to said weigh beam, sharp load knife edges fixed to said weigh beam, a fixed bearing surface engageable by said fulcrum knife edge, load bearing planes engageable with said load knife edges, supporting means for releasably holding said load bearing planes above and out of engagement with said load knife edges and for releasably holding said fulcrum knife edge above and out of engagement with said fixed bearing surface, manually operable means for lowering said supporting means to cause said fulcrum knife edge to engage said fixed bearing surface and said load bearing planes to engage said load knife edges and motion retarding means acting independently of the speed of movement of said manually operable means for controlling the velocity of impact of said fulcrum knife edge upon said fixed bearing surface and the velocity of impact of said load bearing planes upon said load knife edges, said motion retarding means including a rockable member having an element interposed in the path of movement of a portion of said supporting means and adapted to be rocked in one direction by said manually operable means and in the other direction by the descent of said supporting means.

6. In a balance, a weigh beam, a sharp fulcrum knife edge fixed to said weigh beam, sharp load knife edges fixed to said weigh beam, a fixed bearing surface engageable by said fulcrum knife edge, load bearing planes engageable with said load knife edges, supporting means for releasably holding said load bearing planes above and out of engagement with said load knife edges and for releasably holding said fulcrum knife edge above and out of engagement with said fixed bearing surface, manually operable means for lowering said supporting means to cause said fulcrum knife edge to engage said fixed bearing surface and said load bearing planes to engage said load knife edges, motion retarding means acting independently of the speed of movement of said manually operable means for controlling the velocity of impact of said fulcrum knife edge upon said fixed bearing surface and the velocity of impact of said load bearing planes upon said load knife edges and means for permitting accelerated movement of said supporting means when all of the said knife edges and bearing surfaces and planes are in engagement.

7. In a balance, a weigh beam, a sharp fulcrum knife edge fixed to said weigh beam, sharp load knife edges fixed to said weigh beam, a fixed bearing surface engageable by said fulcrum knife edge, load bearing planes engageable with said load knife edges, supporting means for releasably holding said load bearing planes above and out of engagement with said load knife edges and for releasably holding said fulcrum knife edge above and out of engagement with said fixed bearing surface, manually operable means for lowering said supporting means to cause said fulcrum knife edge to engage said fixed bearing surface and said load bearing planes to engage said load knife edges and motion retarding means acting independently of the speed of movement of said manually operable means for controlling the velocity of impact of said fulcrum knife edge upon said fixed bearing surface and the velocity of impact of said load bearing planes upon said load knife edges, said motion retarding means including a rockable member having an element interposed in the path of movement of a portion of said supporting means and adapted to be rocked in one direction by said manually operable means and in the other direction by the descent of said supporting means, a dashpot having a piston and a flexible strip connecting the piston to the rockable member.

8. In a balance, a weigh beam, a sharp fulcrum knife edge fixed to said weigh beam, sharp load knife edges fixed to said weigh beam, a fixed bearing surface engageable by said fulcrum knife edge, load bearing planes engageable with said load knife edges supporting means for releasably holding said load bearing planes above and out of engagement with said load knife edges and for releasably holding said fulcrum knife edge above and out of engagement with said fixed bearing surface, manually operable means for lowering said supporting means to cause said fulcrum knife edge to engage said fixed bearing surface and said load bearing planes to engage said load knife edges, and motion retarding means acting independently of the speed of movement of said manually operable means for controlling the velocity of impact of said fulcrum knife edge upon said fixed bearing surface and the velocity of impact of said load bearing planes upon said load knife edges, said motion retarding means including a rockable member having an element interposed in the path of movement of a portion of said supporting means and adapted to be rocked in one direction by said manually operable means and in the other direction by the descent of said supporting means, a dashpot having a piston and a flexible strip connecting the piston to the rockable member, said dashpot having a vent and the length of the connection between the piston and the rockable member being adjustable to provide for the opening of said vent after all of said knife edges are in engagement with said bearing surfaces and bearing planes.

References Cited in the file of this patent

UNITED STATES PATENTS

| | | |
|---|---|---|
| 1,132,880 | Sartorius | Mar. 23, 1915 |
| 2,297,141 | Gattoni | Sept. 29, 1942 |
| 2,316,947 | Flanagan | Apr. 20, 1943 |
| 2,404,601 | Seyter | July 23, 1946 |
| 2,567,161 | Griffin | Sept. 4, 1951 |
| 2,581,807 | Mettler | Jan. 8, 1952 |
| 2,582,517 | Williams | Jan. 15, 1952 |

FOREIGN PATENTS

| | | |
|---|---|---|
| 9,411 | Germany | Apr. 17, 1880 |